United States Patent [19]

Uchida et al.

[11] Patent Number: 4,878,460
[45] Date of Patent: Nov. 7, 1989

[54] INTAKE SYSTEM FOR V-TYPE INTERNAL COMBUSTION ENGINE

[75] Inventors: Hiroyasu Uchida, Hiroshima; Kazuhiko Ueda, Higashihiroshima, both of Japan

[73] Assignee: Mazda Motor Corporation, Hiroshima, Japan

[21] Appl. No.: 264,651

[22] Filed: Oct. 31, 1988

[30] Foreign Application Priority Data

Oct. 30, 1987 [JP] Japan .............................. 62-273363

[51] Int. Cl.⁴ .......................................... F02B 25/28
[52] U.S. Cl. .............................. 123/52 MV; 123/563
[58] Field of Search ................. 123/559, 563, 52 MV, 123/52 M, 52 MC, 55 VF, 55 VS, 55 VE, 55 V

[56] References Cited

U.S. PATENT DOCUMENTS

| | | | |
|---|---|---|---|
| 3,881,455 | 5/1975 | Belsanti | 123/563 |
| 3,976,041 | 8/1976 | Mettig et al. | 123/563 |
| 4,513,695 | 4/1985 | Patchen | 123/41.1 |
| 4,592,329 | 6/1986 | Yunick | 123/545 |
| 4,653,439 | 3/1987 | Desai et al. | 123/52 MV |

Primary Examiner—David A. Okonsky
Attorney, Agent, or Firm—Fleit, Jacobson, Cohn, Price, Holman & Stern

[57] ABSTRACT

An internal combustion engine of a V-type having first and second brake set at an angle to each other. A mechanical supercharger is arranged in the space between two banks and an intercooler is arranged above one of two banks. A first intake collecting passage connects to first independent intake passages of the first bank and a second intake collecting passage connects to second independent intake passages of the second bank. The intake passages are arranged in the space between two banks below the mechanical supercharger. A first branch intake passage connects the first intake collecting passage with the intercooler and a second branch intake passage connects the second intake collecting passage with the intercooler.

14 Claims, 4 Drawing Sheets

INTAKE SYSTEM FOR V-TYPE INTERNAL COMBUSTION ENGINE

FIELD OF THE INVENTION

The present invention relates to a novel construction for a V-type internal combustion engine, whose cylinders are arrayed in two inclined rows and form a V-shaped as used in an automotive vehicle, and more particularly, to a V-type internal combustion engine having a novel intake structure.

BACKGROUND OF THE INVENTION

An internal combustion engine has been developed with improved charging efficiency obtained by means of a supercharger, such as a mechanical supercharger. When the mechanical supercharger is used, it is necessary to arrange it compactly in the space afforded or provided for the engine in the automobile. In a V-type internal combustion engine, because space on the side of the engine is especially narrow, the mechanical supercharger is located between two inclined cylinder rows. Such an arrangement is known from Japanese Utility Model Publication No. 61 (1986)-1624.

To obtain high volumetric efficiency, it was thought that an intercooler should be provided between a mechanical supercharger outlet and an intake manifold. In such an arrangement, however, intake tubes between the supercharger outlet and an intercooler inlet and between the intercooler outlet and the intake manifold have to turn and twist in order for them to be arranged compactly in the engine room. Such a tube layout is apt to increase the intake flow resistance of intake air. Increasing the intake flow resistance causes a decrease in engine output power and increases fuel consumption.

Recently, volumetric efficiency is improved by means of utilizing resonance effects of intake air. When resonance effects are used, it is necessary that resonance passages, which are arranged upstream of the intake collecting portion where discrete passages for cylinders are collected, be designed to have a desirable length in order to achieve optimum resonance effects in the range of predetermined engine speed.

SUMMARY OF THE INVENTION

The primary object of the present invention is to provide a V-type internal combustion engine having a mechanical supercharger and an intercooler with a novel intake system which is compact in size and simple in arrangement, and can take advantage of resonance effects of intake air.

The object of the present invention is achieved by an intake system for a V-type internal combustion engine having first and second banks set at an angle to each other including a plurality of cylinders in each bank which do not fire one after another and intake ports provided in the side facing the space between the first and second banks. A mechanical supercharger is arranged in the space between the first and second banks. An intercooler is arranged above the first bank. First and second intake collecting passages are arranged below the mechanical supercharger and feed supercharged air to the banks. A first branch intake passage is connected to the first intake collecting passage with the intercooler. A second branch intake passage is connected to the second intake collecting passage with the intercooler. A plurality of first independent intake passages are connected to the first intake collecting passage with the intake ports of the cylinders constituting the first bank independently. A plurality of second independent intake passages are connected to the second intake collecting passage with the intake ports of the cylinders constituting the second bank independently.

BRIEF DESCRIPTION OF THE DRAWINGS

The above and other objects and features of the present invention will be apparent from the following description of a preferred embodiment when taken in conjunction with the appended drawings, in which:

FIG. 2 is a cross-sectional view of the engine shown in FIG. 1;

DESCRIPTION OF THE PREFERRED EMBODIMENT

Figure 1:
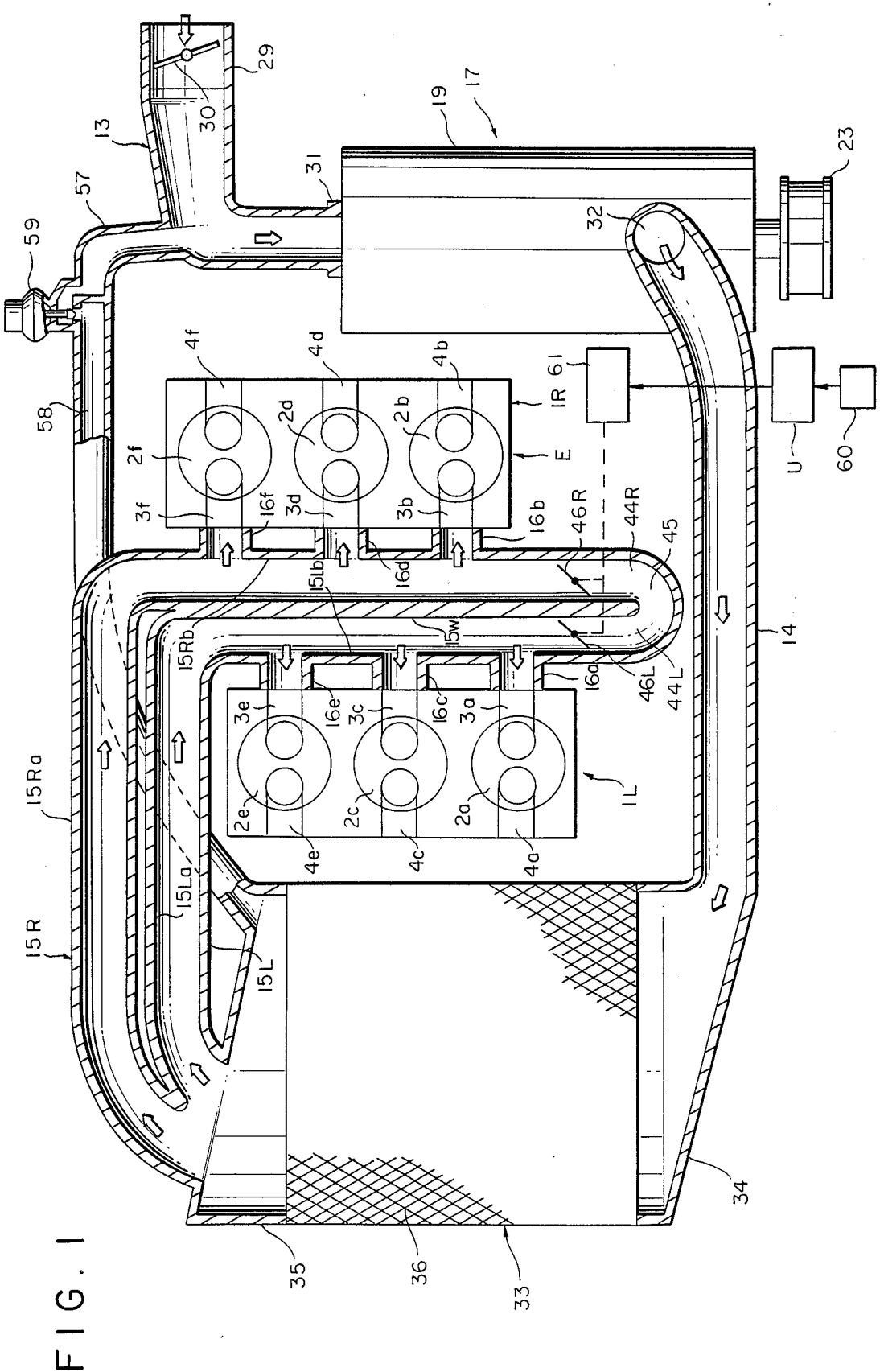
FIG. 1 is a schematic view showing a V-6 engine provided with an intake system in accordance with a preferred embodiment of the present invention.
Figure 2:
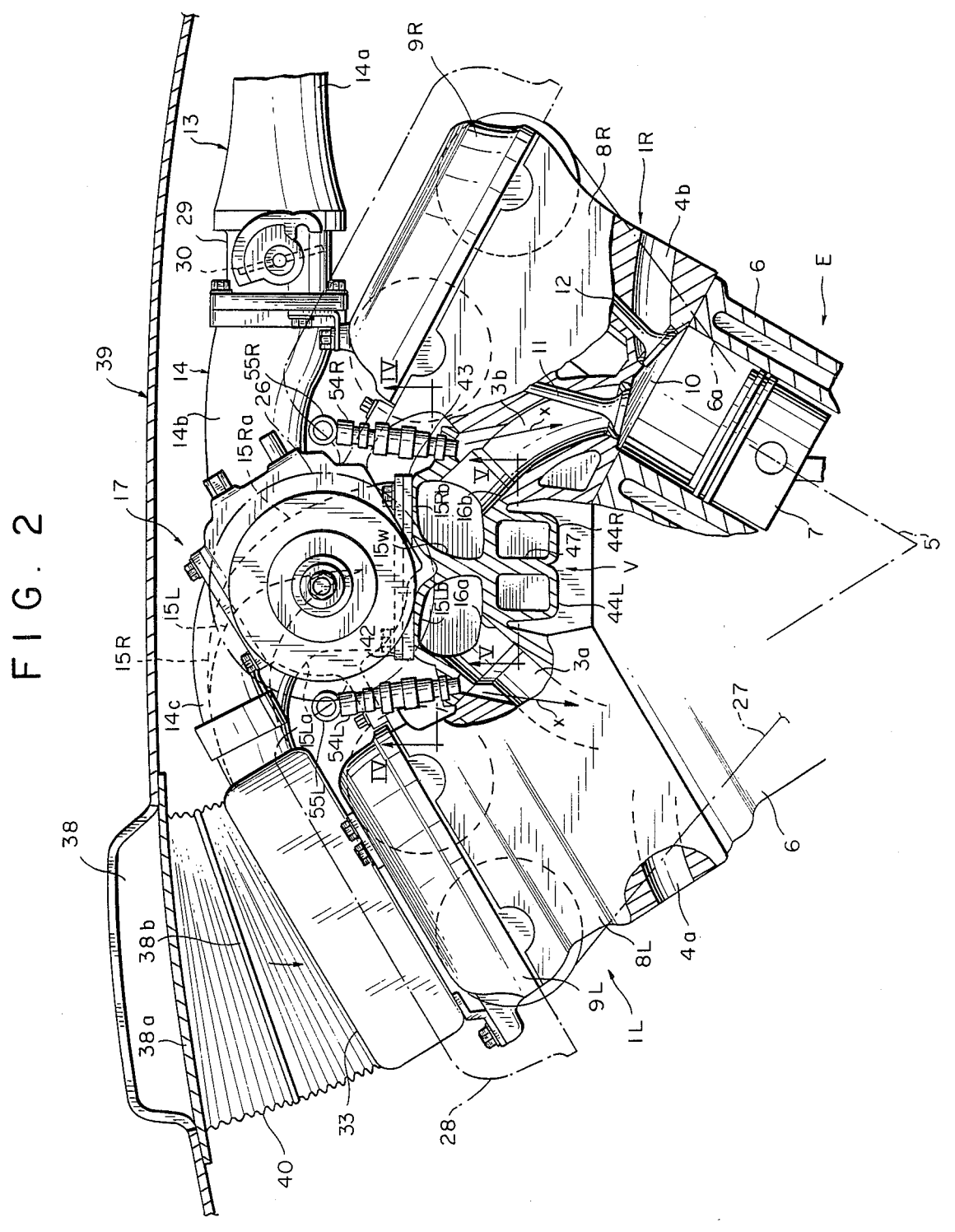
Figure 3:
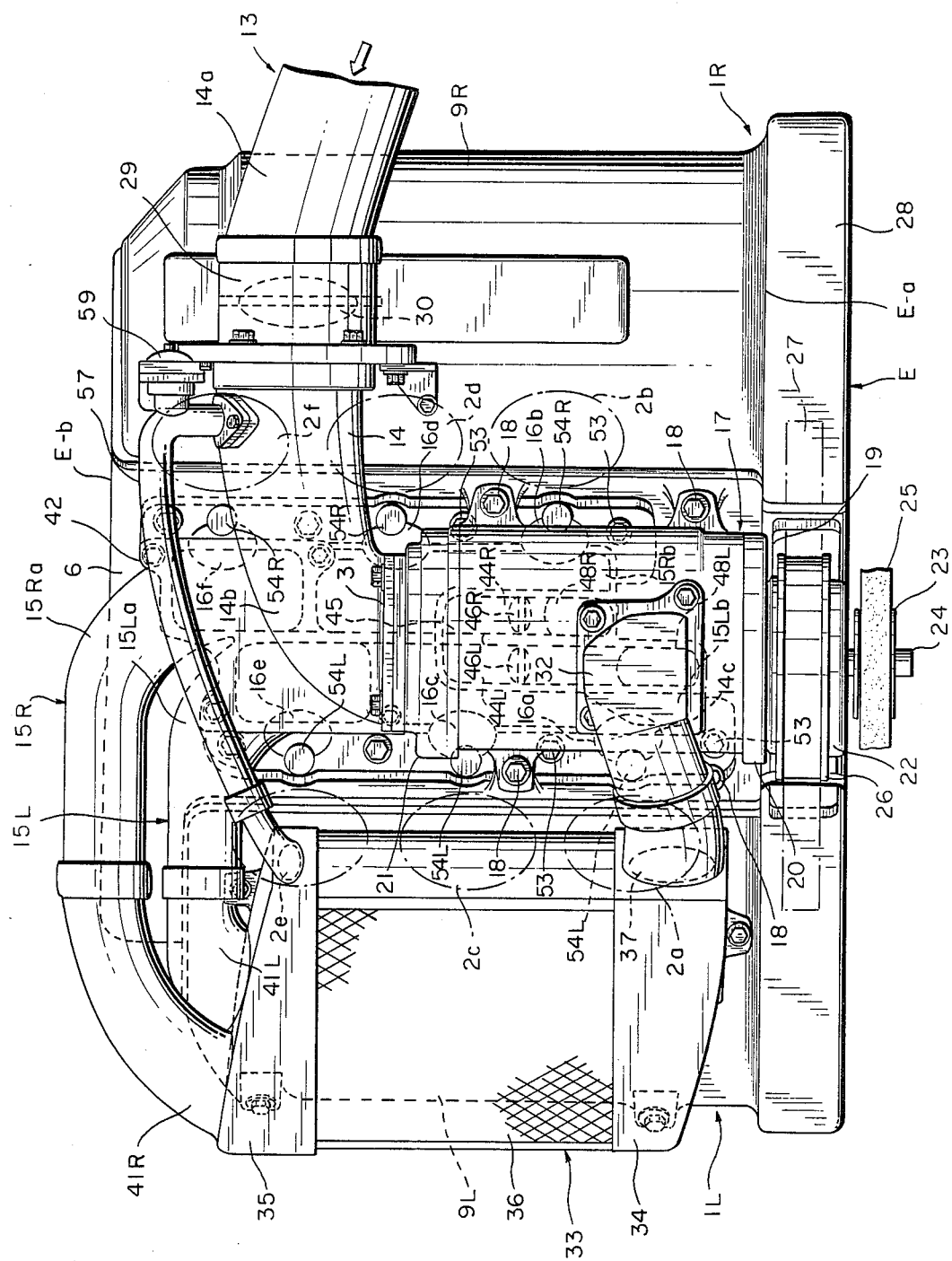
FIG. 3 is a plan view of the engine.

Referring to the drawings in detail, particularly to FIGS. 1 to 3, an engine body E of a V-6 engine having an intake system in accordance with a preferred embodiment of the present invention is shown, consisting of left and right cylinder banks 1L and 1R arranged in a V-formation with a predetermined relative angle, for example, a relative angle of 60 degrees. No. 1, No. 3 and No. 5 cylinders $2a$, $2c$ and $2e$ are formed in the left cylinder bank 1L, and No. 2, No. 4 and No. 6 cylinders $2b$, $2d$ and $2f$ are formed in the right cylinder bank 1R. The No. 1 cylinder $2a$, the No. 6 cylinder $2f$, the No. 3 cylinder $2c$, the No. 4 cylinder $2d$, the No. 5 cylinder $2e$ and the No. 2 cylinder $2b$ are fired in order. That is, the cylinders $2a$ to $2f$ are divided into two groups and the cylinders in each group are disposed in one and the same cylinder bank 1L or 1R, respectively, so that adjoining cylinders in each cylinder bank 1L or 1R do not fire one after another. The cylinders $2a$ to $2f$ are, respectively, provided with intake ports $3a$ to $3f$ whose opening extend toward a V-shaped space V between the cylinder banks 1L and 1R. Further, the cylinders $2a$ to $2f$ are, respectively, provided with exhaust ports $4a$ to $4f$ whose openings extend to the sides of the corresponding cylinder banks remote from the V-shaped space V.

The cylinders $2a$, $2c$ and $2e$ in the left cylinder bank 1L and the cylinders $2b$, $2d$ and $2f$ in the right cylinder bank 1R are arranged in rows parallel to a crankshaft 5, respectively. The rows of the cylinders $2a$, $2c$ and $2e$ in the left cylinder bank 1L is offset forward with respect to the vehicle in which it is mounted (downward in FIG. 1 and 3) relative to the row of the cylinders $2b$, $2d$ and $2f$ in the right cylinder bank 1R.

The engine E has a cylinder block 6 provided with cylinder bores $6a$ in which pistons 7 can slide, a left cylinder head 8L is mounted on block 6 and provides for the left cylinder bank 1L and a right cylinder head 8R is mounted on block 6 and provides for the right cylinder bank 1R. Cylinder head covers 9L and 9R are provided to cover the upper portions of the left cylinder head 8L and the right cylinder head 8R, respectively. Combustion chambers 10 are formed in the cylinders by the tops of the pistons 7, a lower wall of the cylinder heads 8 and the cylinder bores 6a. The intake ports 3a to 3f and the exhaust ports 4a to 4f open into each combustion chamber 10, and are opened and shut at a predetermined timing by intake valves 11 and exhaust valves 12, respectively.

Intake air is introduced into the cylinders 2a to 2f through an intake passage 13 comprising a common intake pipe 14, and left and right branch intake pipes 15L and 15R branching off from the downstream end of the common intake pipe 14.

The intake parts 3a, 3c and 3e for the cylinders 2a, 2c and 2e in the left cylinder bank 1L are separately communicated with the left branch intake pipe 15L by way of discrete intake pipes 16a, 16c and 16e which are relatively short in length. Similarly, the intake ports 3b, 3d and 3f for the cylinders 2b, 2d and 2f in the right cylinder tank 1R are separately communicated with the right branch intake pipe 15R by way of discrete intake pipes 16b, 16d and 16f which are relatively short in length. The left branch intake pipe 15L is constructed from an upstream pipe part 15La and a downstream pipe part 15Lb. Similarly, the right branch intake pipe 15R is constructed from two parts, an upstream pipe part 15Ra and a downstream pipe part 15Rb. The downstream pipe parts 15Lb and 15Rb extend or project into the V space between the cylinder banks 1L and 1R from one end of the cylinder banks and then extend in parallel to the crankshaft 5. In this particular embodiment, the downstream pipe parts 15Lb and 15Rb and the discrete intake pipes 16a to 16f are integrally formed by casting, and are fixed to the engine body E by bolting the discrete intake pipes 16a to 16f on the corresponding cylinder banks 1L and 1R. The downstream pipe parts 15Lb and 15Rb are divided by a partition wall 15W.

A mechanical supercharger 17, which is a screw type supercharger, such a supercharger is described in U.S. Pat. No. 4,588,363, having a columnar shape is disposed above the downstream pipe parts 15Lb and 15Rb, and is fixed to the cylinder heads 8L and 8R by bolts 18. The longitudinal axis of the mechanical supercharger 17 is parallel to the crankshaft 5. The mechanical supercharger 17 consists of a cylindrical body 19, first and second end walls 20 and 21, two rotors (not shown), an on-off clutch means 22, a pulley 23, a drive shaft 24 and gearing (not shown). The first and second end walls 20 and 21 are fixed to the ends of the cylindrical body 19 by bolts in an airtight manner. Two rotors are disposed in the space between the cylindrical body 19 and two end walls 20 and 21, and are connected by the gearing so as to rotate in opposite directions. The drive shaft 24 is fixed to one of the rotors, and extends in parallel to the crankshaft 5 and projects from the cylindrical body 19 through the first end wall 20. The pulley 23 is coaxially fixed on the end of the part of the shaft 24 projecting from the cylindrical body 19. The pulley 23 is connected or coupled to the crankshaft 5 by a belt 25 which transmits the engine output to drive the pulley 23. The on-off clutch means 22 are disposed on the drive shaft 24 between the pulley 23 and the first end wall 20 so that the engine output transmitted from the crankshaft 5 is connected to or cut off from the gear means. An idler 26 sets the tension on a timing belt 27 which serves for driving camshafts of both the banks 1L and 1R. Idler 26 is located rotatable about the circumference of the clutch means 22. A belt cover 28 is mounted on the engine and covers the timing belt 27. The mechanical supercharger 17 extends parallel to the direction of the crankshaft 5 and the first end wall 20 is approximately located in a plane approximately the same as the first or most forward engine end wall E-a, the common plane lying to the direction of the crankshaft 5.

A throttle body 29 having a throttle valve 30 is located or positioned above the right cylinder head cover 9R.

The common intake pipe 14 is divided into first, second and third common intake pipe segments 14a, 14b and 14c. The first common intake pipe segment 14a connects the throttle body 29 to an upstream positioned air cleaner (not shown). The second common intake pipe segment 14b connects the throttle body 29 to inlet port 31 of the supercharger 17 through the second end wall 21. The second common intake pipe segment 14b extends horizontally at a right angle to the crankshaft 5 from the throttle body 29, and then turns 90 degrees toward the supercharger 17. An outlet port 32 of the supercharger 17 is located at the top of the cylindrical body 19.

A thin or flat air-cooled intercooler 33 being of rectangular parallelepiped shape is disposed above the left cylinder head cover 9L and is fixed on the head cover 9L through four brackets and bolts. The intercooler 33 consists of an inlet tank 34, an outlet tank 35 and a core 36. The third common intake pipe segment 14c connects the outlet port 32 of the supercharger 17 and inlet port 37 of the intercooler 33 formed in one end wall of the inlet tank 34 near the V-shaped space defined by the engine. The third common intake pipe segment 14c extends vertical relative to the direction of extension of the crankshaft 5 and then curves downwardly toward the intercooler 33. The core 36 is provided so that supercharged air can flow in parallel to the crankshaft 5 toward second engine end wall E-b being at the opposite end of the engine from the first engine and wall E-a.

An air scoop 38 is provided on the vehicle hood 39 located above the intercooler 33 in order to take in ambient air. The scoop 38 is connected to the core 36 through a duct 40. Ambient air taken in from the scoop 38 flows against the core 36 so that the charged air is cooled down. Brackets 38a and 38b serve to fix and hold the duct 40 in proper orientation.

Outlet ports 41L and 41R are connected independently to one side wall of the outlet tank 35, the side wall extending perpendicularly to the crankshaft 5. Ports 41L and 41R extend horizontally from the side wall to the right bank 1R.

The outlet port 41L is connected to the upstream pipe part 15La and the outlet port 41R is connected to the upstream pipe part 15Ra. The upstream pipe parts 15La and 15Ra curve downwardly in a C-shaped from their joints with the outlet ports 41L and 41R and are connected to the downstream pipe parts 15Lb and 15Rb. The upstream pipe parts 15La and 15Ra are formed integrally with each other and are provided with a flange 42 at their downstream ends with the openings at the downstream ends facing downwardly for connection to the downstream pipe parts 15Lb and 15Rb. The downstream ends of the upstream pipe parts 15La and 15Ra are arranged in a side space of the second end wall 21 of the supercharger 17. The downstream pipe parts 15Lb and 15Rb are provided with a flange 43 at their ends adjacent or near the second engine end wall E-b. Flanges 42 and 43 are superimposed and lie horizontally, so the upstream openings of the downstream pipe parts 15Lb and 15Rb are facing upwardly in registry with the downward facing openings at the downstream ends of pipe parts 15La and 15Ra. The connecting flanges 42 and 43 are formed at the end position of the upstream pipe parts 15La and 15Ra remote from the supercharger 17. Four bolts connect flanges 42 and 43 to each other.

Figure 4:
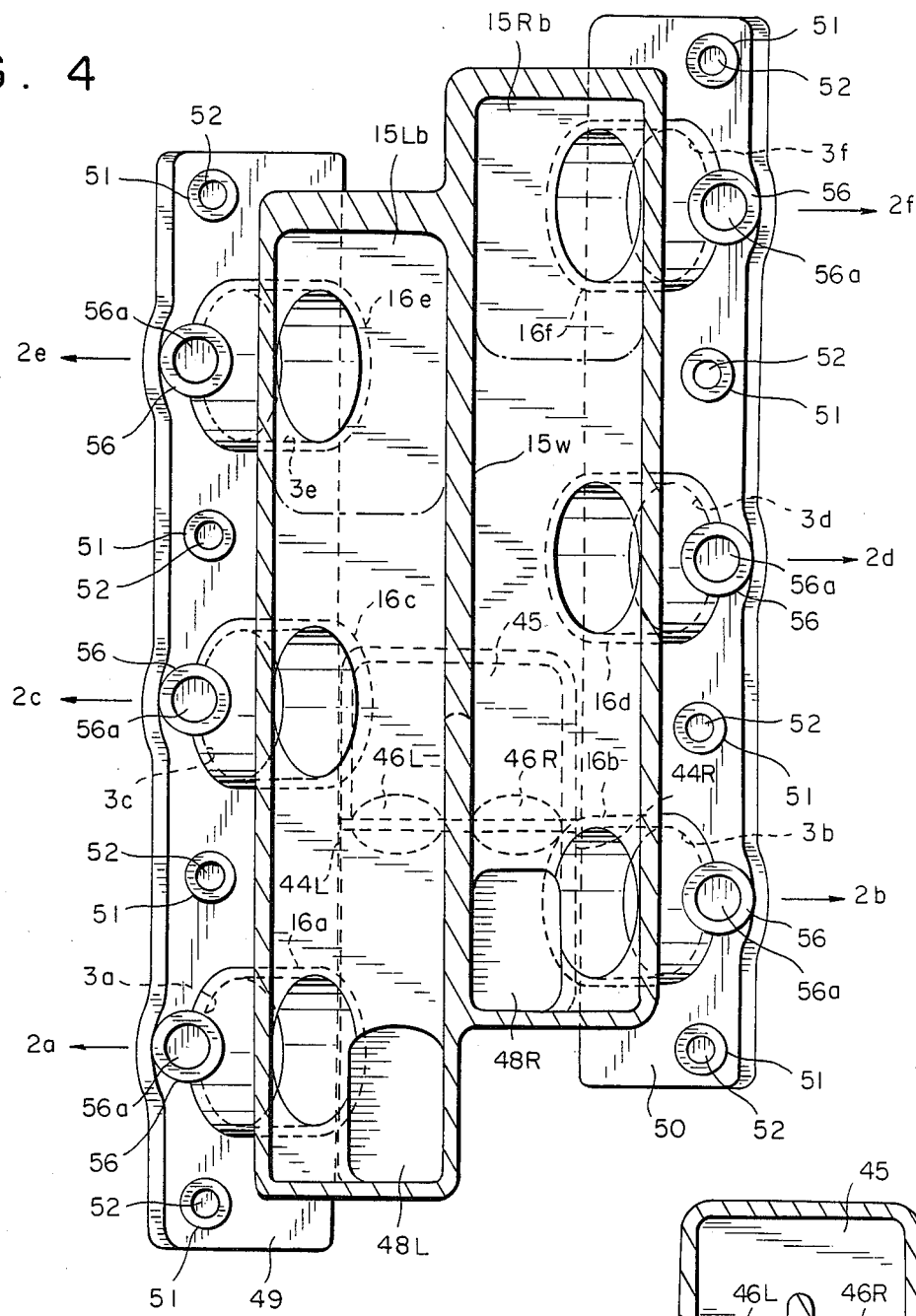
FIG. 4 is a cross-sectional view of FIG. 2 taken along line IV—IV.
Figure 5:
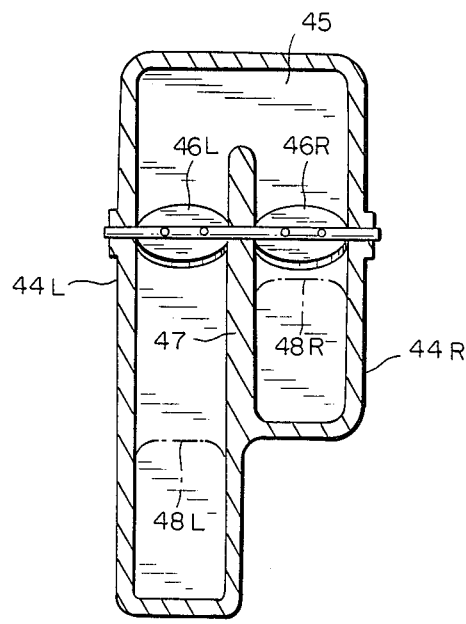
FIG. 5 is a cross-sectional view of FIG. 2 taken along line V—V.

The downstream pipe parts 15Lb and 15Rb are, respectively, provided with extension pipes 44L and 44R. The extension pipes 44L and 44R project downward from the lower wall of the downstream pipe parts 15Lb and 15Rb at the opposite side to the side to where the upstream pipe parts 15La and 15Ra are connected. The extension pipes 44L and 44R extend in parallel to the crankshaft 5, and lie in the V-shaped space V and are communicated with each other at their end portions or regions 45 of the extension pipes 44L and 44R. The extension pipes 44L and 44R are opened and closed by on-off valves 46L and 46R. The extension pipes 44L and 44R are divided by a partition wall 47 lying in a plane normal to crankshaft 5 and extending in the axial direction of the crankshaft 5. The top of the pipes 44L and 44R open into the downstream pipe parts 15Lb and 15Rb through holes 48L and 48R, respectively. The downstream pipe parts 15Lb and 15Rb, the discrete intake pipes 16a to 16f, and the extension pipes 44L and 44R are integrally formed by casting. As shown in FIG. 4, a flange 49 is formed integrally with the discrete intake pipes 16a, 16c and 16e at the downstream ends thereof having openings corresponding to the pipes 16a, 16c and 16e, and a flange 50 is formed integrally with the discrete intake pipes 16b, 16d and 16f at the downstream ends thereof having openings corresponding to the pipes 16b, 16d and 16f. Each of the flanges 49 and 50 is provided with four bosses 51 having bolt hole 52, respectively, and are installed on the corresponding cylinder heads 8L and 8R by bolts 53. The cross-sectional area of the extension pipes 44L and 44R is smaller than the cross-sectional area of the downstream pipe parts 15Lb and 15Rb.

Three fuel injection valves 54 are provided in flange 49 one in each of the discrete intake pipes 16a, 16c and 16e at the downstream end thereof, and three fuel injection valves 54R are provided in flange 50 one in each of the discrete intake pipes 16b, 16d and 16f at the downstream end thereof. The upper ends of the fuel injection valves 54L and 54R are positioned higher than the downstream pipe parts 15Lb and 15Rb, and are, respectively, connected to delivery pipes 55L and 55R. The delivery pipes 55L and 55R extend in parallel to the crankshaft 5. Fuel in a fuel reservoir (not shown) is pumped into the delivery pipes 55L and 55R through a fuel supply passage (not shown) and distributed to the fuel injection valves 54L and 54R. The fuel injection valves 54L and 54R are supported partly by the delivery pipes 55L and 55R, and partly by fuel injection valve installing bosses 56 defining holes 56a near the points where the intake pipes 16a to 16f are connected to intake ports 3a to 3f. The fuel injection valves 54L and 54R are fixed substantially vertically by fuel injection valve installing holes 56a and the delivery pipes 55L and 55R, and the direction X of fuel injection from the fuel injection valves 54R and 54L is inclined toward the intake valves 11 from the central axes of the injection valves 54R and 54L (shown in FIG. 2). As the result, the fuel is able to be supplied into the combustion chamber 10 smoothly. And, the central axes of the fuel injection valves 54R and 54L lie in a direction perpendicular to the horizontal plane of the engine that includes the crankshaft 5 so that it is possible to create sufficient space to provide the supercharger 17 in the V shaped space V between the fuel injection valves 54R and 54L easily.

A relief pipe 57 defining a relief passage 58 connects the second common intake pipe segment 14b with the outlet tank 35, and is provided with a relief valve 59 opening and closing the relief passage 58. When the intake pressure of the downstream side of the supercharger 17 is higher than a predetermined value (0.31–1.2 Kg/cm$^2$) or the on-off clutch means 22 is off, the relief valve 59 is opened.

An engine speed signal is input into a control unit U from an engine speed sensor 60, and control unit U outputs a control signal to an actuator 61 mechanically coupled to valves 46L and 46R for driving the on-off valves 46L and 46R according to the engine speed signal. That is, when the engine speed is lower than a predetermined value Ne (Ne=3000–5000 r.p.m.) the on-off valves 46L and 46R are closed, and when the engine speed is higher than the value Ne, the on-off valves 46L and 46R are opened.

In low engine speed range lower than the value Ne where both on-off valves 46L and 46R are closed, the left and right branch intake pipes 15L and 15R are communicated with each other by way of the outlet tank 35 forming a first pressure reflecting portion, whereby an extremely long resonance air column is formed so as to contribute to or enhance the supercharging effect in the low engine speed range.

In the high engine speed range, higher than the value Ne, where the on-off valves 46L and 46R are opened and the left and right branch intake pipes 15L and 15R are effectively communicated by way of both the outlet tank 35 and the end portions 45 of the extension pipes 44L and 44R forming a second pressure reflecting portion, the resonance reaches a peak at an engine speed which is higher than the engine speed at which the resonance reaches a peak in the low engine speed range. In the state that the on-off valves 46L and 46R are opened, the left and right branch intake pipes 15L and 15R are communicated by way of the first and second pressure reflecting portions, thereby forming a circular passage. In the intake ports corresponding to the cylinders which are not fired one after another (for example, the intake ports 3a, 3c and 3e corresponding to the cylinders 2a, 2c and 2e of the left cylinder bank 1L), basic pressure vibrations which consist of negative pressures produced in the course of the intake strokes of the respective cylinders 2a, 2c and 2e and positive pressures produced at the end of the intake strokes are generated in the manner of a sine curve. For example, the pressure wave generated in the intake port 3e corresponding to No. 5 cylinder 2e is propagated in two opposite directions along the circular passage; and acts to the other intake ports corresponding to the other cylinders of the same cylinder bank i.e., the intake ports 3a and 3c corresponding to No. 1 and No. 3 cylinders 2a and 2c in the left cylinder bank 1L. In this case, the pressure wave is propagated along the circular passage without being reflected.

When the time required for the pressure wave to make a circuit of the circular passage is equalized to the cycle $\tau$ of the basic pressure vibrations described above, that is, when the relation between the overall length L of the circular passage (an equivalent length calculated taking into account the influence of the volume of the discrete intake pipes and the like) and the cycle $\tau$ becomes $\tau = L/a$ (wherein $a$ represents the speed of sound), a pressure wave generated in No. 5 cylinder 2e and propagated along the circular passage is superposed on a pressure wave generated in No. 3 cylinder 2c, and the pressure wave propagated from No. 3 cylinder 2c is superposed on a pressure wave generated in No. 1 cylinder 2a in a similar manner, and the pressure wave propagated from No. 1 cylinder 2a is superposed on the next pressure wave generated in No. 5 cylinder 2e in a similar manner. Thus, the pressure waves generated in the cylinders 2a, 2c and 2e in the left cylinder bank 1L resonate with each other, whereby the pressure vibration is enhanced. Similarly, the pressure waves generated in the cylinders 2b, 2d and 2f in the right cylinder bank 1R resonante with each other, whereby the pressure vibration is enhanced. By virtue of the resonance effect, the volumetric efficiencies in the respective cylinders can be highly improved in the high speed range.

Further, it is preferred that length l and the diameter d of each discrete intake pipe be selected to satisfy the following formula:

$$\frac{\theta}{6} \times \frac{a}{2\pi} \sqrt{\frac{\frac{\pi}{4} d^2}{lVm}}$$

wherein $\theta$ represents the crank-angle degree that the intake valve is open, Nmax represents the highest acceptable engine speed, $a$ represents the speed of sound and Vm represents the mean volume of the combustion chamber while the intake valve is open. That is, when the above formula is satisfied, inertia effect supercharging cannot occur in the discrete intake pipe. When inertia effect supercharging occurs in the discrete intake pipe, resonance effect supercharging is interfered with. More particularly, as is well known, the inertia effect is a phenomenon wherein a pressure propagates through a distance 2l+$\alpha$,$\alpha$ representing the distance between the piston and the intake valve at the time when the piston speed is at its maximum during the time interval T from the time at which the piston speed is at its maximum to the end of the intake stroke while a negative pressure wave is converted into a positive pressure wave. The resonant wave which is generated at the end of the intake stroke takes time T' substantially equal to the time interval T to propagate through distance 2. Accordingly, when inertia effect occurs, the phases of the pressure waves differ from each other by about T, and, thus, interfere with each other. Accordingly, it is preferred than the sizes of the discrete intake pipes be selected to satisfy the above formula in order to prevent occurrence of the inertia effect.

Because an intake collecting passage includes the discrete intake pipes 16a, 16c and 16e and the downstream pipe part 15Lb, and the discrete intake pipes 16b, 16d and 16f and the downstream pipe part 15Rb, is formed by an integral casting with pipe structures and the discrete intake pipes 16a to 16f are formed with a short length (for example, 15 50 mm), the high resonance effect can be obtained for the above-mentioned reason, and the engine height can be sharply decreased even though the supercharger 17 is provided within the V-shaped space V. As the supercharger 17 and the intercooler 33 are provided above the engine body E, the intake passage 13 can be compact and simple in a layout. Furthermore, as the intake air flow from the outlet port 32 of the supercharger 17 to the downstream pipe parts 15Lb and 15Rb always curving in the direction, a C-shaped or spiral flow, the intake resistance to the flowing intake air is decreased. As a result, high volumetric efficiency can be obtained and engine output power is increased. On the other hand, fuel consumption is decreased.

The upstream ends of the left and right branch intake pipes 15L and 15R independently communicate with the outlet tank 35 of the intercooler 33 having a relatively large volume (for example, volume of the tank 35=0.5−1.5 l) as compared with other intake passage parts. Because of this relatively large volume, the pressure reflecting effect at the outlet tank 35 is improved, and the resonance effect in the low engine speed range using air column resonance between the left and right branch intake pipes 15L and 15R is heightened.

Furthermore, because the relief passage 58 communicates with the outlet tank 35, the pressure fluctuation hardly propagates to the relief valve 59, and relief valve 59 fluttering is suppressed. On the other hand, the intake air can be nearly equally distributed and supplied among the left and right cylinder banks 1L and 1R when the valve 59 is opened in the state or condition when the on-off clutch means 22 are off.

It is to be understood that whereas the invention has been described in detail with respect to a preferred embodiment, nevertheless, various other embodiments and variants are possible which are within the spirit and scope of the invention, and such are intended to be covered by the following claims.

What is claimed:

1. An intake system for a V-type internal combustion engine comprising:
    (a) an engine having elongated first and second banks set at an angle to each other to define a V-shaped space therebetween, each bank including a plurality of cylinders not intended to be fired one after another, and intake ports for the cylinders provided in the side of the bank facing toward the V-shaped space;
    (b) a supercharger means positioned in the V-shaped space for feeding supercharged air to the cylinders;
    (c) intercooler means coupled to said supercharging means for receiving cooling supercharged air from the supercharger means, said intercooler means being positioned above the first bank;
    (d) first and second intake collecting passages located in the V-shaped space below the supercharger means for receiving cooled air from the intercooling means and feeding same as intake air to the first and second banks, respectively;
    (e) a first branch intake passage coupling the first intake collecting passage with the intercooler means;
    (f) a second branch intake passage coupling the second intake collecting passage with the intercooler means;
    (g) a plurality of first separate intake passages coupling the first intake collecting passage with the intake ports of the cylinders constituting the first bank; and
    (h) a plurality of second separate intake passages coupling the second intake collecting passage with the intake ports of the cylinders constituting the second bank.

2. An intake system as defined in claim 1 wherein the supercharger means has a columnar body, first and second end walls fixed to the both ends of the columnar body, the first end wall being approximately aligned with a first engine end wall extending perpendicular to the long direction of the banks, the coupling from the supercharger means to the intercooler means being constituted by a passage extending perpendicular to the long direction of the banks, the first and second branch intake passages extending perpendicular to the long direction of the banks and, respectively, coupled to the first and second intake collecting passages near a second engine end wall opposite the first engine end wall, and the intercooler means being constituted so that intake air flows parallel to the long direction of the banks.

3. An intake system as defined in claim 2 wherein the supercharger means includes a drive shaft projecting from the columnar body through the first end wall, a pulley coaxially fixed on the projecting part of the drive shaft, an inlet port opening defined in the second end wall and an outlet port opening defined in the columnar body.

4. An intake system as defined in claim 1 wherein the intercooler means has an outlet tank having a relatively large volume and each of the first and second branch intake pipes is separately coupled to the outlet tank.

5. An intake system as defined in claim 4 further comprising a relief passage coupling, the outlet tank to the upstream side of the supercharger means and a relief valve means for opening and closing the relief passage.

6. An intake system as defined in claim 1 wherein the first and second intake collecting passages are coupled at their downstream ends forming a circular passage running through the first branch intake passages the first intake collecting passage, the second intake collecting passage and the second branch intake passage, and being adapted to propagate pressure waves generated by intake strokes without reflecting same.

7. An intake system as defined in claim 6 wherein the coupling of the downstream ends of the first and second intake collecting passages is effected at a point below the first and second intake collecting passages.

8. An intake system as defined in claim 6 further including valve means for opening and closing the downstream ends of the first and second intake collecting passages and valve control means for controlling the valve means to permit propagation of pressure waves during a predetermined engine speed range.

9. An intake system as defined in claim 8 wherein the valve means is controlled to close when engine speed is below a predetermined value.

10. An intake system as defined in claim 6 wherein the length and the diameter of each of the first and second separate intake passages are selected reduce inertia effect therein.

11. An intake system as defined in claim further comprising a fuel injection valve provided in each of the first and second separate intake passage at the downstream end thereof, the injection valves being positioned in the spaces between the supercharger means and the first and second banks, the direction of fuel injected from each fuel injection valve being inclined from the central axis of the fuel injection valve and being directed toward the associated input port.

12. An intake system as defined in claim 1 wherein the intercooler means is an air-to-air heat exchanger, and further comprises an air scoop provided in a hood located above the intercooler means to take in ambient air and air duct means coupled at one end to the air scoop and at the other end to the intercooler means for flowing ambient air against the intercooler.

13. An intake system as defined in claim 6 wherein each of the first and second intake collecting passages is formed as a pipe extending in parallel to the long direction of the banks.

14. An intake system as defined in claim 2 in which a tension pulley is coaxially mounted on the supercharger means to tense a timing belt.

* * * * *